United States Patent [19]

McLaren et al.

[11] 3,855,103

[45] Dec. 17, 1974

[54] ELECTRICAL TREATER SYSTEM FOR PRODUCING A COMBUSTIBLE FUEL

[75] Inventors: Theron D. McLaren, Houston; Jack T. Sawdy, Pasadena, both of Tex.

[73] Assignee: Petrolite Corporation, St. Louis, Mo.

[22] Filed: Jan. 10, 1974

[21] Appl. No.: 432,381

Related U.S. Application Data

[63] Continuation of Ser. No. 199,447, Nov. 17, 1971, abandoned.

[52] U.S. Cl.................. 204/306, 137/93, 204/190, 252/359 B
[51] Int. Cl........................ B03c 5/02, G05d 11/00
[58] Field of Search .......... 204/184, 185, 188, 190, 204/302–306; 252/358–360; 55/45, 171-7; 208/187, 251 R, 262

[56] References Cited
UNITED STATES PATENTS

| | | | |
|---|---|---|---|
| 3,784,461 | 1/1974 | Kusovsky et al.................. | 204/306 |
| 3,592,752 | 7/1971 | Pfeifer................................. | 204/188 |
| 3,441,496 | 4/1969 | Murdock, Sr....................... | 204/304 |
| 3,582,527 | 6/1971 | Lucas.................................. | 204/302 |
| 3,256,902 | 6/1966 | Porter................................. | 137/93 |
| 3,163,173 | 12/1964 | Kuntz.................................. | 137/93 |

Primary Examiner—John H. Mack
Assistant Examiner—Aaron Weisstuch
Attorney, Agent, or Firm—Emil J. Bednar

[57] ABSTRACT

A system for producing a combustible fuel by using one or more electrical treaters for resolving a water-in-oil emulsion within an electrical field into a treated oil phase and an effluent water phase. The emulsion is formed by mixing untreated oil and fresh water. Intermixing of the fresh water into the untreated oil and the water content of the treated oil removed from the electrical treaters are monitored. A control valve in a first position directs the treated oil to a subsequent utilization as a combustible fuel and in a second position diverts the treated oil from such utilization into a reject tank or recycle operation. A controller adjusts the control valve from the second position to the first position only when both the fresh water being intermixed in a certain amount and in a finaly dispersed state into the treated oil to produce the emulsion and the water content of the treated oil are within preset operational limits to produce the combustible fuel. If desired, start-up and shut-down, in a preset step sequence, of the electrical treater may be provided by the combination of the controller and a sequence programmer for full automation of the electrical treater system in producing the combustible fuel.

15 Claims, 1 Drawing Figure

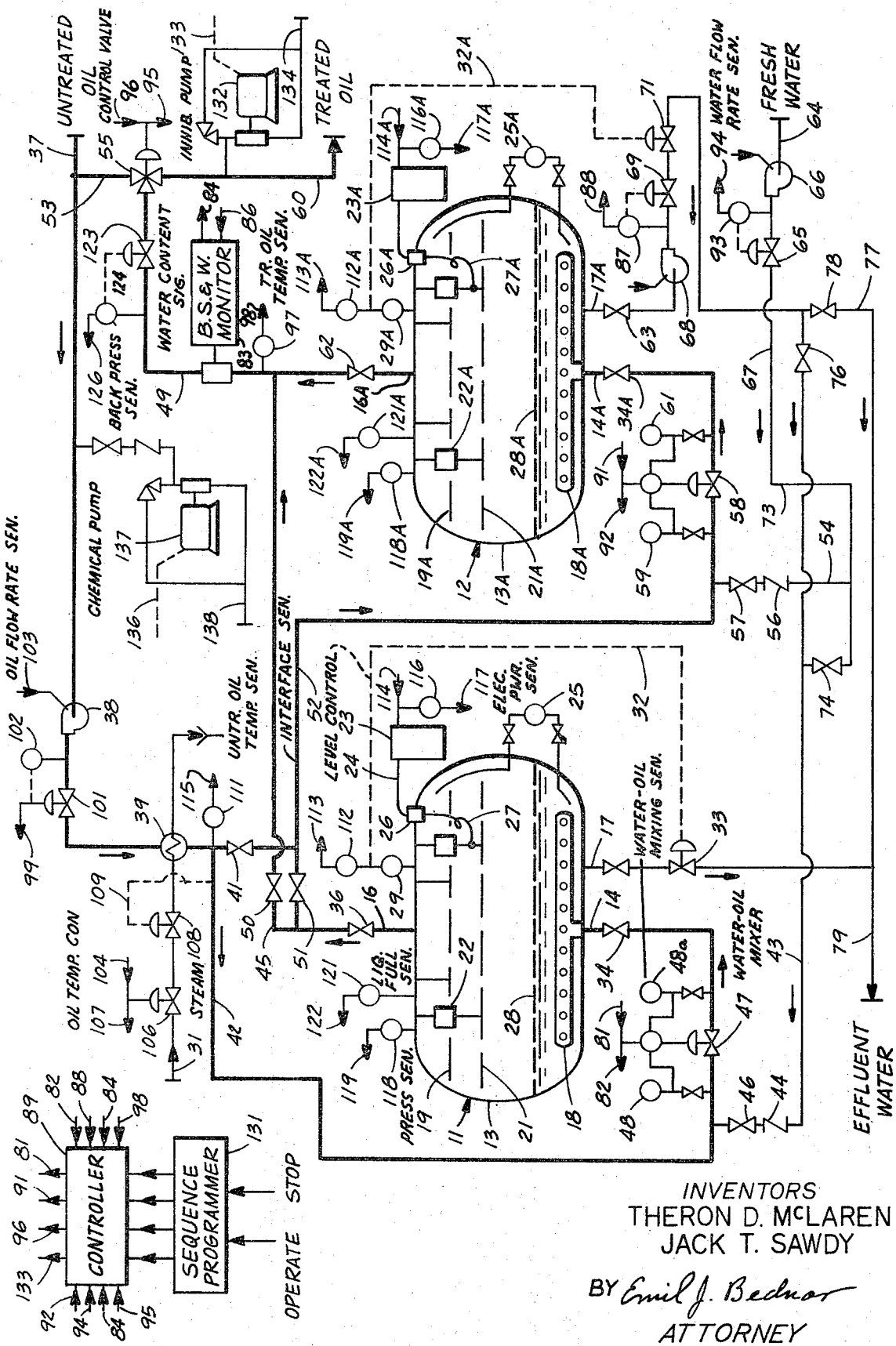

ELECTRICAL TREATER SYSTEM FOR PRODUCING A COMBUSTIBLE FUEL

This is a continuation of application Ser. No. 199,447, filed Nov. 17, 1971 now abandoned.

BACKGROUND OF THE INVENTION

1. Field of the Invention

The present invention relates to a system for separating contaminates from an untreated oil to produce a combustible fuel. More particularly, it relates to the removal of such contaminates by the electrical field resolution of an emulsion formed of fresh water dispersed within the untreated oil.

2. DESCRIPTION OF THE PRIOR ART

Gas turbines have a wide application and utility in providing sources of power at relatively high efficiencies from greatly reduced machinery compared to steam and internal combustion prime movers. Gas turbines are small in size and weight, and they require only a modest foundation for proper installation. They do not require cooling water, are able to run unattended, and may be fully controlled by automation devices and remote control systems. Other noteworthy advantages of the gas turbine reside in rapid start-up and shut-down features of operation, the large amounts of power provided by a relatively small installation, reduced maintenance and stand-by costs, and extended operational life in either continuous or intermittent service.

The most common gas turbine is that employed for propelling jet aircraft. This application of the gas turbine is well known to the general public. However, there are many other applications of the gas turbine in non-aviation applications. The placement of gas turbines in stationary installations has greatly increased in the last two decades. These installations range in size from 50 to nearly 50,000 horse power in gas turbines. Electrical generating usage employes about half the large industrial installations of gas turbines. These gas turbines are employed mainly in electrical power generation for peak-load duty to which they are well suited by integration into automation and remote control systems. This usage of gas turbines is especially advantageous where additional electrical power capacity may be needed more quickly than can be provided by the conventional stationary steam generating power plant. Other uses of the gas turbine include installations as the prime mover for compressors which are employed for moving gas through a pipe line. Other installations include gas turbine driven railroad locomotives, naval and maritime vessels, prime movers in the petroleum and steel industries.

The fuel for the gas turbine in non-aviation installations was originally natural gas, and other gaseous type fluids can be used which are clean burning and non-corrosive. However, gaseous fluids are not always practical in locomotives, ocean-going vessels and the like. Since 1952, major advances have been accomplished in the use of liquid fuels for gas turbines. One of the first installations of this type was a crude oil fired turbine in an oil pipe line pumping installation. Other types of liquid fuels have been used in gas turbines, which fuels include distillates, crude oil, and products of crude oil refining such as residium and residual oils. One installation of the gas turbine has been operated with creosote pitch as the fuel. Whatever liquid is employed, certain specifications must be observed otherwise the gas turbine is quickly injured by corrosion and deposition effects. In non-distillate types of liquid fuels, such as crude oil and residual crude oil products, the limiting item of the specifications is generally the sodium and vanadium ion contents. These two materials can be tolerated only in amounts up to a few parts per million before there is the danger of corrosion, fouling and deposition at elevated temperatures. These materials, during combustion, produce sodium sulfate, sodium vanadates, and vanadium pentoxide which are semi-molten and corrosive at temperatures as low as 1,150°. The corrosive attack by these materials becomes virtually catastrophic at the higher temperatures normally associated with efficient gas turbine operation. Operation of the gas turbine at lower firing temperatures, results in substantially impaired power output and reduced operating efficiency.

Additives have been found which may be added to liquid fuels for inhibiting vanadium attack upon the metal surfaces of the gas turbine at elevated temperatures. Usually, magnesium ion (magnesium sulfate) is added in small amounts to the liquid fuel to inhibit the undesired effects of vanadium materials within the gas turbine. However, no additive or inhibiter has been found which can prevent the disastrous problems occurring from burning sodium-containing liquid fuels at normal industrial gas turbine temperature levels, which temperatures are approximately between 1,400° and 1,600°F.

The liquid fuels which contain sodium (crude oil and residium) may be treated by a process which resembles the desalting of crude oil in refineries. The sodium material may be present in the liquid fuel as salt water and/or sodium chloride crystals. These sodium materials may be removed by adding fresh water to the oil phase followed by an intimate mixing step to form a water-in-oil emulsion. The emulsion is then resolved by settling, centrifuging or electrical field desalting, to reduce the sodium content to acceptable levels. However, once the treated liquid fuel is obtained, it must be protected from subsequent salt material contamination during transportation or while it is in storage for use as fuel for the gas turbine. For example, the treated liquid fuel transported by an ocean-going tanker can become contaminated by the unintended intermixing of a small amount of sea water. Additionally, all storage tanks must be maintained clean and free of any salt contaminated substances so that the treated oil remains uncontaminated.

Oil refineries since 1937 have employed Petreco electric desalters for reducing the salt content of crude oils to levels of a few parts per million. These electric desalters receive an emulsion formed by mixing fresh water into the crude oil. The emulsion, with an electrical field, is resolved into a desalted crude oil phase and an effluent water carrying extracted salt bearing materials. The electric desalting operation may employ one or more electrical treaters, or a single vessel containing two electric field desalting stages, in a completely integrated installation within the oil refinery processing train. Electric desalters in present-day modern refinery installations are substantially automated for continuous operation and desalt crude oil without any substantial operator attention. The automation of electric desalters in refineries is relatively simple since the refinery processing is a relatively stable continuous operation and provides most of the operating conditions needed by the desalters. Any improper operation of the electrical desalter provides a change in one or more operating conditions of subsequent refinery processing steps. For this reason, samples are usually taken only at 8-hour intervals of the desalted crude oil in a refinery where laboratory testing determines the residual salt content, and the water content, of the desalted crude oil.

A desalted crude oil or residium may be provided by processing in a refinery and will serve as an adequate pure liquid fuel for the gas turbine. However, subsequent recontamination by salt-bearing materials detract from such liquid fuels for gas turbines in field installations. Consider the installation of a gas turbine as a prime mover upon a crude oil pipe line. A separate storage tank would be required for the refinery desalted crude oil to be employed as liquid fuel for the gas turbine. The direct application of electric desalters to the crude oil pipe line installation would require additional automation devices and greater operator attention since the operating advantages would be loss of integration of the electrical desalter into a refining processing complex. For example, there are fifteen or more process conditions which would be controlled in the refining processing complex rather than directly upon the desalters.

In other installations, such as the preparation of a treated liquid fuel for locomotives, the smaller amount of fuel consumed would not justify a refinery-type complex installation of electrical desalters. Alternatively, the amount of liquid fuel consumed by the gas turbine in such installations would require excessively large storage facilities for the desalted liquid fuel. Small-sized electric treaters for resolving emulsions have been available for a number of years in the market place, and are known as Chemelectric dehydrators. Reference may be taken to U.S. Pat. No. 3,207,686 for an example of this type dehydrator. The field installation of the dehydrator includes sufficient automated devices that the dehydrator can be made to operate unattended, in start-up, normal treating operation, and shut-down, and at remote installations without operator attention. This type of dehydrator has made it possible to provide LACT facilities in automated systems for producing crude oil to pipeline specifications. For this purpose, the crude oil emulsion is dehydrated by application of an electric field to a residual water content of 3 percent by volume or less. The operation of the dehydrator may be monitored with a conventional B S & W monitor. Subsequent refinery operations provide for desalting the crude oil.

The present invention is directed to an electrical treating system which combines the advantageous features of the refinery integrated electrical desalter with the automated advantages of the oil field installed electric dehydrator in treating salt-containing liquid fuels, such as crude oil and residium, to provide a combustible liquid fuel usable in gas turbines without fear of disastrous corrosion, molten salt deposition, and ash erosion problems.

SUMMARY OF THE INVENTION

In accordance with this invention, there is provided an electrical treater system for producing a combustible fuel which may be consumed in gas turbines. One or more vessels have means providing emulsion inlet, oil outlet and water outlet connections, and electrodes energizable from an external power source to create an electric field for resolving a water-in-oil emulsion into a treated oil phase and an effluent water phase. Untreated oil and fresh water are supplied to a mixing device to produce the emulsion. Monitoring means generate signals indicating fresh water is being intermixed into the untreated oil to form the emulsion and the water content of the treated oil removed from the oil phase outlet. The oil phase outlet is connected to a control valve which has a first position to direct the treated oil to a subsequent utilization as combustible fuel. The control valve has a second position to divert the treated oil from this utilization. Controller means, receiving signals from the monitoring means, adjust the control valve from the second position to the first position only when the signals indicate fresh water is being intermixed into the untreated oil to produce the emulsion and the water content of the treated oil are within preset operational limits to produce a combustible fuel.

DESCRIPTION OF THE DRAWING

The drawing is a schematic flow diagram of a two-stage electric desalter system arranged in accordance with the present invention.

DESCRIPTION OF SPECIFIC EMBODIMENTS

The electrical treater system of the present invention may be employed for producing a combustible fuel from untreated oil from any source. The untreated oil may be crude oil or crude oil products such as residual oils and residium. As the term "untreated oil" is used herein is meant an oil which has a sufficiently high content of salt (sodium ion-containing material) that it is an undesired combustible fuel, especially in gas turbines. The untreated oil is processed in the present system for reducing the sodium material content to relatively low levels, usually 5 ppm or less, and a residual water content of less than 0.5percent by volume. In the present system, the untreated oil is processed to these specifications to produce a combustible fuel which is especially suited for use as the liquid fuel in gas turbines. In many cases, the present system will produce a combustible liquid fuel having a salt content of about 2ppm and a residual water content of about 0.1 percent by volume. In addition to producing such a highly purified combustible fuel for gas turbine usage, the present system operates to provide the combustible fuel with high reliability from a minimum of automated control devices. However, the present system can also be expanded by the application of programmed automated devices so that the system can start-up, operate and shut-down according to preset operating step functions with a minimum of operator attention. In this regard, the present system for producing a combustible fuel is well matched to the rapid start-up, high power output and shut-down abilities of the gas turbine as a prime mover.

Although a single electrical treater may be employed to carry out the functions of the present electric treater system, it is preferred to employ two electrical treaters arranged for series flow of the untreated oil. Such an arrangement may be termed a two-stage electrical treater desalter operation. The term "desalting" is used herein to denote a process which is commonly used for processing crude oils for removal of salt material. Desalting is also intended in this description to apply equally to the processing of any untreated oil by admixing fresh water to form an emulsion, and the subsequent electrical resolution of the emulsion into a treated oil phase and an effluent water phase.

Referring now to the drawing, there is shown a two-stage desalting operation of the electrical treater system of this invention which may be conducted with electrical treaters 11 and 12 interconnected for series flow of the untreated oil. The untreated oil passes through the first stage treater 11 and then through the second stage treater 12. The treaters 11 and 12 are shown identical in construction. Therefore, their various elements will be described specifically relative only to the treater 11. It is to be understood that the treater 12 has the same elements which are designated by like-reference numerals but carrying a postfix A for the purposes of the present description unless otherwise designated.

The electrical treaters 11 and 12 can be of any construction capable of resolving electrically water-in-oil emulsions or dispersions. For example, the apparatus illustrated in U.S. Pat. No. 2,855,359 may be employed for this purpose. Furthermore, in many instances only one of these electrical treaters needs to be employed. In other circumstances, it will be desirable to employ two electrical treaters connected for parallel flow of the untreated oil. If desired, the series or parallel untreated oil flow may be carried out in two stages in an electrical treater having a single vessel as shown in U.S. Pat. No 2,894,895.

The electrical treater 11 needs only to provide a suitable electric field and phase separating conditions in which a water-in-oil emulsion is coalesced or resolved electrically into separate treated oil and effluent water phases. Generally, the electrical treater 11 will have an electrical field in the treater defined by electrodes spaced apart between about 3 and about 11 inches. The electrical potential applied to these electrodes creates a gradient in the electrical field usually between about a 1,000 and about 10,000 volts per inch. The magnitude of the gradient, or the applied potential, within the electrical treater 11 which resolves the emulsion is not critical.

More specifically, the treater 11 is formed of a horizontal cylindrical metal-walled vessel 13 which carries an emulsion inlet 14, a treated oil outlet 16 and an effluent water outlet 17. The inlet 14 connects to a perforated pipe distributor 18 which extends substantially throughout the length of the vessel 13. A horizontally disposed grounded electrode 19 is superimposed above an energized electrode 21 suspended from insulators 22 within the vessel 13. The electrode 21 is energized from a transformer 23 mounted upon the exterior surface of the vessel 13. The transformer 23 provides a high-voltage, alternating current by an insulated cable 24, a feed-through bushing 26 and interconnecting lead 27 to the energized electrode 21.

The transformer 23 connects to a suitable source of power which may be an A.C. supply system.

During operation of the treater 11, a water-oil interface 28 is maintained within the vessel 13 by a level control system 29. The system 29 is actuated by any suitable means, such as a float, to operate through an interconnection (indicated by dashed line 32) to a motor valve 33 connected to the water outlet 17. The flow through the emulsion inlet 14 is controlled by valve 34; and the flow through the treated oil outlet 16 is controlled by a valve 36.

The functioning of the interface level controller 29 for maintaining the interface 28 at the desired horizon within the vessel 13 is monitored by a sight glass assembly 25. Other means for adjusting the level controller 29 may be employed, if desired.

Untreated oil, from any source, is moved through conduit 37 by a pump 38 into a heat exchanger 39 where its temperature is increased to a suitable level before entering the conduit 42 for transfer to the treater 11 through the emulsion inlet 14. The untreated oil is heated in the heat exchanger 39 by steam supplied from the conduit 31. Generally, the temperature of the untreated oil is raised to approximately 150°F., or higher, before being introduced into the treater 11. The fluids within the treater 11 may also be heated, if desired. Increased temperatures facilitate the desalting of the untreated oil.

Fresh water, from any suitable source, is introduced into a water supply line 43, passes through a check valve 44 and a blocking valve 46 to be introduced into the inlet conduit 42. The fresh water and untreated oil pass through mixing device to form a water-in-oil emulsion applied to the inlet 14. Any suitable mixing device may be employed to form this emulsion. A mixing device with preset operating characteristics may be employed for this purpose; and the device illustrated in U.S. Pat. No. 3,527,697 can be employed. However, in some applications, a mixing device, such as an adjustable valve, is preferred. A motor actuated mixing valve 47 within the inlet conduit 42 is adjusted to provide the desired mixing of the fresh water into the untreated oil phase. The adjustment of the mixing valve 47 is monitored by upstream and downstream pressure gauges 48 and 48a. Generally, a pressure drop across the mixing valve 47 of between 5 and 10-pounds will be sufficient for purposes of the present system. However, it is preferred to employ a 10-pound pressure differential across the valve 47 to ensure adequate mixing of the fresh water into the untreated oil.

The term "fresh water" as used herein, is intended to include any water which has a sufficiently low content of sodium ion that it may be intimately mixed into the untreated oil to form the emulsion entering the inlet 14, and upon resolution of the emulsion, to produce a treated oil phase removed through the outlet 16 which treated oil phase has a reduced sodium ion content. Generally, the fresh water will be municipal water, or water from a river or other non-brackish water source. The effluent water, carrying removed sodium ion material, is removed through water outlet 17 and sent to a water disposal system.

In some instances, the treated oil phase removed through the outlet 16 may be passed to a subsequent utilization as the combustible fuel for a gas turbine or the like. For this purpose, the treated oil is removed through conduit 45 and block valve 50 into a treated oil line 49. The treated oil line 49 terminates at a control valve 55 which can be a three-way valve. The valve 55 has a first position to pass the treated oil into a product conduit 60 for passage to a subsequent utilization as a combustible fuel. Generally the product conduit 60 connects to a small storage vessel or surge tank in which a small inventory of fuel can be maintained for supplying the treated oil to a gas turbine of the like. The valve 55 has a second position in which the treated oil is diverted into a reject line 53. The reject line can connect to a reject oil storage tank but preferably connects to the conduit 37 for recycling the rejected oil through the electrical treater 11.

In some cases, the untreated oil could have such a high content of sodium ion material that a single stage of desalting in the electrical treater 11 will not reduce the residual sodium ion content to a desired level for producing a combustible fuel. In such a case, or for other reasons, the treated oil in the outlet 16 is passed to the electrical treater 12. For this purpose the valves 41 and 50 are closed and valve 51 in the second stage inlet conduit 52 is open to permit the flow of the treated oil from the first stage to pass into the inlet 14A carried on vessel 13A. The treated oil in the conduit 52, may be considered to be untreated oil for the electrical treater 12 because of its residual sodium ion content. Fresh water, from any suitable source, is introduced through a conduit 54 and passes through check valve 56 and block valve 57 to merge into the untreated oil in conduit 52. The untreated oil and water mixture is passed through a mixing device before entering the inlet 14A. As described previously, the mixing device can be of any suitable construction and may take the form of a motor-actuated mixing valve 58 which operates at a pressure differential indicated by pressure gauges 59 and 61. Thus, the mixing valve 58 is readily adjusted; and generally, at least 10-pound differential is maintained across valve 58 during operation with crude oil or products thereof, as the untreated oil.

The fresh water and untreated oil emulsion enters the vessel 13A through the inlet 14A. The electrical field resolves the emulsion into a treated oil phase which is removed through the outlet 16A and block valve 62 and flows into the product conduit 49. The effluent water coalesced in the electrical treater 12 is removed through water outlet 17A and a block valve 63 and may be sent to a water disposal facility. However, it is preferable in the operation of the electrical treaters 11 and 12 when arranged for series flow of the untreated oil, that the fresh water, from any suitable source is introduced into conduit 64 and moved by pump 66 through conduit 67 into the second stage fresh water conduit 54. In this arrangement, the second stage effluent water passes from the outlet 17A through a water pump 68 and block valve 69 into the fresh water supply conduit 43. The flow of the effluent water through the water outlet 17A is regulated by the level controller 29A to maintain the oil-water interface 28A at a selected horizon. The controller 29A operates a motor valve 71 in the first stage fresh water supply conduit 43 to regulate the flow of second stage effluent water. The motor valve 71 is actuated by the level controller 29A with an interconnection indicated by dashed line 32A. With this arrangement, fresh water from the source conduit 64 passes into the second stage electrical treater 12, and then, the effluent water phase is withdrawn through the outlet 17A and supplied as the fresh water supply in conduit 43 to the electrical treater 11.

If desired, fresh water may be supplied from the supply conduit 64 into both the fresh water supply conduits 43 and 54 of the first and second stage electrical treaters 11 and 12. For this purpose, a bypass conduit 73 is connected through a block valve 74 to the fresh water supply conduit 43 downstream of the motor valve 71. A block valve 76 in the fresh water supply conduit 43 is closed to isolate the water supplies between the electrical treaters. The effluent water passing through the motor valve 71 is removed through an effluent water conduit 77 and a block valve 78 to join the effluent water passing through the motor valve 33 to a commom discharge line 79.

There has been described an arrangement employing two electrical treaters which may be connected for series or parallel flow of the untreated oil, and also for series or parallel flow of the fresh water which is intermixed with the untreated oil to form the emulsion supplied to these treaters. Thus, it is possible to operate the electrical treaters 11 and 12 in series flow of the untreated oil or in parallel flow, or to operate either the treater 11 or the electrical treater 12 with the other treater being blocked-in.

It is possible to monitor and control approximately 25 operating parameters of the electrical treaters 11 and 12, such as flows, temperatures, pressures, water contents, salt contents by a complex control system to ensure that the treated oil entering the product conduit 49 has the necessarily reduced sodium ion content to form an acceptable combustible fluid, especially for gas turbine fuel usage. However, in accordance with the present eletrical treater system, not more than three operating conditions need to be monitored to ensure satisfactory production of treated oil for use as a combustible fuel. For this purpose, monitoring means are associated with the electrical treaters to indicate fresh water is being intermixed into the untreated oil to form the emulsion and the water content of the treated oil. These monitored conditions promptly reflect a sufficiently large deviation in either operating electrical treaters of any condition from predetermined electrical treater parameters to produce a treated oil unsuitable as a combustible fuel. For example, the desalting of the untreated oil usually requires between 2 and 30 percent by volume of fresh water to be intermixed and finely dispersed into the oil phase to provide the emulsion entering an electrical treater. However, good desalting operation is obtained with the intermixing of fresh water in volumetric amounts of between 5 and 10 percent. If an orifice mixer is employed which is preset to disperse the water into the oil phase, it is only necessary to measure the amount of water entering the untreated oil to determine proper formation of the emulsion. However, where an adjustable mixing valve 47 is used, the quality of the emulsion also depends upon the pressure differential across the mixing valve. Thus, the simplest system requires measurement only of the amount of fresh water being mixed into the untreated oil phase to provide the emulsion entering the inlet of either electrical treater. An adjustable mixing valve 47, or the like, requires a second measurement to determine the proper formation of the emulsion, i.e., the pressure differential across the valve under operating flow conditions.

Any mechanism may be employed for the monitoring means. Preferably, the monitoring means uses an air supply to provide pneumatic output signals representative of the monitored conditions. This arrangement is also advantageous in that pneumatic input signals can be used for actuating motor driven devices, such as valves, switches, etc. These mechanisms are especially well known in refinery and chemical plant installations.

For this purpose, the valve 47 carries a pneumatic operator which receives an air signal 81 to adjust the valve closure to produce a desired pressure drop (e.g., 10psi) to the fluids which passed through it. In addition, the pneumatic operator mechanism provides a pneumatic output signal 82 indicative of the pressure drop established across the mixing valve 47. The valve 58 associated with the electrical treater 12 is arranged in a similar manner to be actuated by signal 91 and producing a signal 92 indicative of the pressure differential presented to fluids flowing through the valve.

The treated oil in the product line 49 is monitored by a BS&W monitor 83 which provides an output signal 84 representative of the water content in the treated oil. Various types of BS&W monitors may be employed for this purpose. However, BS&W monitors using capacitance-type probes have been employed in the system with good results. The signal 84, representative of the water content of the treated oil, can be pneumatic or electrical in accordance with common practices. Further, the BS&W monitor can be placed into operation with a signal 86 which can be pneumatic or electrical. Thus, operation of the electrical treater 11 in the described arrangement of the present system is indicated by (1) the signal 82 representative of the pressure differential across the mixing valve 47 when fresh water enters at a known rate into the conduit 42 and (2) the signal 84 representative of the water content of the treated oil in conduit 49. Alternatively, an orifice mixer can be employed as a substitute for the mixing valve 47. Then, only the rate of water flow in the fresh water supply line 43 must be determined for a given signal 84 from the BS&W monitor to indicate proper operation of the electrical treater 11.

Preferably, a signal indicative of the rate of fresh water being introduced into the untreated oil is combined with the monitoring function provided by the signal 82. For this purpose, a flow detector 87 is connected downstream of the water pump 68 in the fresh water supply conduit 43 for the electrical treater 11. The flow sensing device 87 provides a signal 88 indicative of normal flow rates for fresh water being carried in the fresh water conduit 43.

It is necessary to combine the single 82 representative of the pressure differential across the valve 47, the signal 88 representative of the flow rate of the fresh water supplied to the electrical treater 11 and the signal 84 from the BS&W monitor 83. Any suitable means may be employed for combining these signals. For example, these signals can be applied to a controller 89 which operates upon pneumatic signals, electrical signals, or a combination of both types of signals. Obviously interfaces may be employed with the controller and signal generating sensors for converting pneumatic signals into electrical signals or the reverse. Good results are obtained with the controller 89 actuated by pneumatic signals. Many types of these controller devices are commonly employed in remote control of refinery systems. The controller used in the "Autocator Pneumatic Sequencing System" can be adopted directly into the present system since it operates from any suitable source of air supply.

Where the electrical treaters 11 and 12 are arranged for series or parallel flow, it may be preferred that the signals associated with both the first and second stage electrical treaters be used. In a like arrangement for the mixing valve 58 to the mixing valve 47, an actuating signal 91 adjusts the pressure differential across the valve 58 and the pneumatic actuator provides an output signal 92 which is representative of the pressure differential across the valve 58. It is also desirable that the flow rate in the fresh water supply conduit 67 be monitored by a flow sensing device 93 connected downstream of the pump 66. The device 93 provides an output signal 94 representative of the flow rate in the conduit 67 supplying fresh water to the electrical treater 12. Thus, the pneumatic signals indicating fresh water is being intermixed into the untreated oil can be taken from either the electrical treater 11 or the electrical treater 12, but preferably, corresponding signals are taken from both treaters and applied to the controller 89. The controller 89 receives the signals 82, 88, 92 and 94 and the signal 84. The controller 89 is adjusted to sense each of these signals and to produce a control signal only when these signals indicate the proper amount of fresh water intermixed with the desired distribution into the untreated oil to produce the emulsion, and the water content of the treated oil are within preset operational limits to produce a combustible fuel. For example, the signals in the controller 89 produce the control signal when 5 percent by volume of fresh water is intermixed into the untreated oil by a 10 psi pressure differential across the mixing valves, and the treated oil has a water content of 0.1 percent by volume. The controller 89 can provide one or more output control signals indicating either proper operation of the electrical treaters 11 and 12 or a failure of any operating conditions which could produce an unacceptable treated oil entering the conduit 49. When the pneumatic signals indicate fresh water is being intermixed in proper amounts and distributed into the untreated oil to produce the emulsion in the electrical treaters 11 and 12, and the water content of the treated oil in the conduit 49 as represented by the signal 84 are within preset operational limits to produce a combustible fuel, the controller 89 provides a signal 96, which may be pneumatic, to actuate the control valve 55 from the second position to the first position. Thus, the controller 89 adjusts the control valve 55 from the second position to the first position only when the signals indicating the operating conditions for the electrical treaters 11 and 12 are within preset operational limits to produce a combustible fuel. The arrangement of the controller 89 with the other elements associated with the electrical treaters provides a fail-safe operation so that only acceptable treated oil is passed through the conduit 49 into the treated oil conduit 60 for a subsequent utilization as combustible fuel. Failure of any signal applied to the controller 89 indicative of improper operation causes the control valve 55 to return into the second position where the treated oil is diverted through the recycle conduit 53 for additional processing.

Process conditions other than represented by signals 82, 84, 88, 92 and 94 can be monitored and representative signals indicating predetermined electrical treater parameters can be supplied to the controller 89 for even further advantages in production of treated oil as a combustible fuel. Many of these process conditions, one at a time, and frequently a plurality of these conditions, can vary from preset values. For example, the flow rate of untreated oil, or the temperature thereof, can vary substantially from a preset value while the treated oil remains acceptable as a combustible fuel. However, the flow rate of untreated oil may increase substantially above the preset value concomitantly with a severe reduction in temperature so that an "upset" in the electrical treaters is imminent. If an upset occurs, the water content of the treated oil quickly increases towards the volume of fresh water introduced as emulsion into the treater. The controller 89 would immediately switch the valve 55 into the second position and recycle the rejected treated oil. This arrangement does protect the purity of the treated oil but can require an extended operating time after the "upset" to restore the electrical treaters 11 and 12 to normal operation. Preferably, the present system monitors additional process conditions, and uses representative signals in the controller 89 to control the valve 55. With this arrangement, no improperly treated oil can reach the product conduit 60, but operational corrections can be made to foreclose an "upset" in the electrical treaters 11 and 12.

Several process conditions can be monitored to determine whether or not the electrical treaters 11 and 12 are within predetermined treater operating parameters. Monitoring devices generate condition signals for indicating a failure to maintain one or more of these conditions within the predetermined treater parameter. These signals are applied to the controller 89 to actuate the control valve 55 from the first position to the second position to prevent unacceptable treated oil reaching conduit 60, if desired. For example, a failure of the heat exchanger 39 to raise the temperature of the untreated oil in the inlet conduit 42 to a desired temperature level requires, for example, 15 minutes to cause a reduction in oil temperature at the inlet 14A of the second stage electrical treater 12. As the temperature of the untreated oil within the electrical treater 12 decreases, the treating efficiency decreases. As a result of excessively low oil temperatures, the water content of the treated oil in the product conduit 49 slowly increases toward unacceptable levels. For this reason, or other reasons, temperature of the untreated oil can be applied as a condition signal to the controller 89 to actuate the control valve 55 from the first position to the second position. The supply of steam in conduit 37 for the heat exchanger 39 is controlled by an actuating signal 104 applied to a motor valve 106 and a signal 107 indicates the opened-valve position in the steam line. The temperature of the oil from the heat exchanger 39 is maintained at a relatively stable level by a control valve 108 actuated from a temperature sensor in the inlet conduit 42 through an interconnection indicated by dashed line 109. If desired, the temperature of the untreated oil can be monitored directly by a sensor 111 mounted downstream of the heat exchanger 39. The sensor 111 generates a signal 115 representative of untreated oil temperature and also permits a ready setting of the motor valve 108 for a given control temperature. The temperature of the treated oil in conduit 49 also is important in a series flow operation of treaters 11 and 12. A temperature sensor 97 connects to the product conduit 49 to measure the temperature of the treated oil which is produced in the electrical treater 12. The temperature is reflected as a signal 98, which may be pneumatic, applied to the controller 89. If desired, other operating conditions associated with the present system may be monitored and reflected as condition signals applied to the controller 89.

The flow of untreated oil in conduit 37 is represented in a signal 99 generated by the back pressure established across a valve 101 by a sensor 102 connected downstream of the pump 38. The signal 99 represents flow rates which must reach a certain magnitude after the pump 38 is actuated by a signal 103 applied to it. The signal 99 applied to the controller 89 may also be used to remove signal 103 from the pump 38, and terminate untreated oil flow, within a predetermined time after the pump 38 is actuated. The oil-water interfaces 28 and 28A within the electrical treaters influence the production of treated oil. These interfaces are monitored by level sensors 112 and 112A associated with the level controls 29 and 29A for producing signals 113 and 113A representative of the maintenance of the interfaces at the desired horizon. The supply of power is applied to the transformers 23 and 23A by actuating signals 114 and 114A which close contactors making the necessary electrical connections. The electrical connections are indicated by sensors 116 and 116A which convert the electrical potential applied to the transformers into signals 117 and 117A applied to the controller 89.

For certain untreated oils, the pressure within the electrical treater 11 should be monitored to prevent "gassing" or exceeding the pressure-containing capacities of the vessels. For this purpose, pressure sensors 118 and 118A are connected to the vessels for providing condition signals 119 and 119A indicating fluid pressures. These signals are supplied to the controller 89. The ultimate safety and operation of the treaters 11 and 12 require that they should be always operated in a liquid-filled condition. This condition is readily ensured by employing sensors 121 and 121A to detect the liquid-filled condition of the vessels and to provide signals 122 and 122A representative of this condition. The signals 122 and 122A are applied to the controller 89 to ensure that a liquid-filled condition is obtained in the vessels before the actuating signals 114 and 114A are applied to connect power to the transformers 23 and 23A. This interlocking signal arrangement will prevent explosion of accumulated gases within the electrical treaters by premature application of electrical power to the electrodes 21 and 21A.

The electrical treaters 11 and 12 for best results should always be operated under sufficient back pressure condition that no gaseous phases can form during electrical field resolution of the emulsion. For this purpose, a back pressure controlled valve 123 is installed in the product conduit 49. The valve 123 is maintained at a given back pressure setting by pressure sensor 124 to maintain, for example, a 50 psi pressure differential upon the treated oil flowing in the product conduit 49. The pressure sensor 124 provides a signal 126 representative of the back pressure being maintained upon the treated oil in the conduit 49. The back pressure signal 126 is applied to the controller 89 for controlling operation of the present system in the same manner as the other condition signals.

It will be apparent that the controller 89 can be arranged so that upon the failure of any condition signal to indicate a predetermined treater parameter, the controller 89 generates an actuation signal 96 applied to the control valve 55 to shift it from the first position into the second position and to actuate an alarm to alert operating personnel.

These condition signals also can provide another useful function. The controller 89 can be arranged to provide actuating signals 81, 86, 91, etc. within a certain predetermined sequence or chronological order to effect the start-up of the electrical treaters 11 and 12, to maintain their normal conditions of operation, and to shut-down the operation of these treaters should any selected one or more of the condition signals show a failure in one or more predetermined treater parameters. This sequencing combination may include all of the condition signals generated by the various sensors associated with the electrical treaters, or by any selected grouping of these signals. For this purpose, a sequence programmer 131 is connected to the controller 89 to provide actuating signals 81, 91, 96 in a certain preset sequence order. Other actuating signals for the present system for purposes of start-up, operation, and shut-down of the system can be programmed into the sequence programmer 131. The sequence programmer 131 can be a timer associated with the controller 89. The programmer 131 can be a more sophisticated device such as a tape or memory controller computer which senses and correlates various condition signals with predetermined operating parameters desired for the present system. Preferably, the arrangement of the sequence programmer 131 and the controller 89 is such that the function of the control valve 55 is controlled by the signals 82, 84, 88, 92 and 94 indicating fresh water is being intermixed properly into the untreated oil and the water content of the treated oil carried in product conduit 49 are within preset operational limits. The other operating conditions produce signals representing various predetermined treater parameters. A failure of one of these condition signals to indicate maintenance of the corresponding predetermined treater parameter actuates the valve 55 to the second position but preferably does not cause an immediate shut-down of the electrical treaters. Rather, the sequence programmer 131 provides an alarm to call the operator's attention to such defect. Only after a certain time delay will the sequence programmer 131 cause the controller 89 to close the necessary valves etc., to terminate fluid flows in the vessel and de-energize the transformers in a shut-down of the electrical treaters.

The present treater system operates in the following manner with the above-described preferred arrangement of the sequence programmer 131 with an "operate" command and the controller 89 places control valve 55 into the second position to recycle treated oil into the untreated oil conduit 37. At this time, the actuator on the control valve 55 produces a condition signal 95 which is returned to the controller 89 indicating the control valve 55 is in the second position. The controller 89 now provides the actuating signal 103 to the pump 38 to start untreated oil flowing through the conduit 37 into the heat exchanger 39. If the valve 101 does not produce a signal 99 representative of the untreated oil flow, the controller 89 will shut-down the entire treater system within a predetermined time limit, which may be, for example, 1 minute. After flow of untreated oil is established in the input conduit 42 with a liquid filled condition in vessels 13 and 13A, the liquid sensors 121 and 121A generate signals 122 and 122A representative of liquid-filled conditions within the electrical treaters. The controller 89 receives the signals 122 and 122A and actuates the back pressure valve 123 in product conduit 49 with the signal 126 indicating the proper operation of the valve 123. The interfaces 28 and 28A should be at their proper horizons. The level sensors 25 and 25A provide visual observation of these horizons, if desired. The level controllers 29 and 29A with associated interface level sensors 112 and 112A provide signals 113 and 113A representative of the position of the interfaces 28 and 28A with the vessels. Next, the controller 89 provides the actuating signal 104 to open the steam valve 106 and pass stream from the conduit 31 through the heat exchanger 39. The flow of stream is indicated by signal 107 and indicates heating of the incoming untreated oil in conduit 42. The temperature of the heat oil is monitored by signal 115 from the temperature sensor 111. The controller 89 provides the actuating signal 114 to energize the transformers with the signals 117 and 117A indicating proper energization of the electrodes 21 and 21A. As the heated untreated oil circulates through the electrical treaters, the temperature gradually rises through the action of the heat exchanger 39. When the temperature sensor 97 indicates a minimum operating temperature has been reached, as for example 90°F., signal 98 from temperature sensor 97 is provided the controller 89 indicating normal operation temperature in the untreated oil has been reached. The water pumps 66 and 68 are energized by actuating signals 127 and 128 from the controller 89. The flow of fresh water within predetermined operational limits is indicated by the rate of flow signals 94 and 88 applied to the controller 89. The signals 82 and 92 received in the controller indicate that the mixing valves are operating with the necessary pressure differential to distribute intimately the fresh water within the untreated oil flowing through the inlets 14 and 14A of the electrical treaters. If no fresh water flow is indicated by the signals 94 and 88 within a predetermined time lapse, as for example 30 seconds, the controller 89 terminates operation of the pumps 66 and 68 and provides an alert alarm of such deficiency. With fresh water being intermixed properly into the untreated oil, the controller 89 provides actuating signal 86 to place the BS&W monitor 83 into operation. After a short period of time in untreated oil recycle operation, the controller 89 receives the signal 84 indicating the water content of the treated oil in the product conduit 49 is within acceptable limits for providing a combustible fuel. For example, the signal 86 indicates an acceptable combustible fuel is flowing through the product conduit 49 when the treated oil has not above 0.1 percent by volume water content. After lapse of a predetermined time period to ensure steady-state operation, the sequence programmer 131 advances the controller 89 to provide signal 96 for actuating the control valve 55 into the first position and thereby move the treated oil into the treated oil conduit 60. The controller 89 at this time may generate an alert alarm for giving the operator notice that the electrical treater system is producing a combustible fuel. If desired, the operator at this time may secure a sample of the treated oil for laboratory testing to verify the sample is within the specifications of the desired combustible fuel. The controller 89 maintains operation of the system until a failure arises in any operating condition or the operator actuates a "stop" command which produces an immediate "shut-down" of the electrical treaters 11 and 12. Any operating situation other than operation at conditions within preset operational limits will result in the control valve 55 being activated with signal 96 from the first position into the second position. The fail-safe features of the present treater system make certain that only the treated oil with acceptable specification for the subsequent utilization as a combustible fuel is sent through the product conduit 60.

The treated oil in conduit 60 usually will contain sufficient amounts of vanadium materials that an inhibitor is required to protect gas turbines or the like. For this purpose, a chemical injection pump 132 is actuated by a signal 133 from the controller 89 to introduce an inhibitor, such as an aqueous solution of magnesium sulfate, into the treated oil passing through the product conduit 60. The inhibitor, from any suitable source, is supplied to the pump inlet 134. The chemical injection pump 132 operates only when the treated oil is passing through the product conduit 60 for subsequent utilization as a combustible fuel.

It is desired, with lower operating temperatures within the electrical treaters or for other reasons, to introduce a de-emulsifying chemical such as a Tretolite compound into the untreated oil flowing through the inlet conduit 37. For this purpose, the controller 89, upon activation of the pump 38, also provides an actuating signal 136 to initiate operation of a chemical pump 137. The pump 137 receives a supply of the de-emulsifier through an inlet 138. Generally, the pump 137 operates only when untreated oil flows in the conduit 37. The operation of the de-emulsifier injection pump 137 and the vanadium inhibitor chemical injection pump 132 can be controlled by the controller 89 in the desired sequencing order of the present system.

Although the present system has been described wherein the various conditions signals are generated by the monitoring and other sensing devices associated with the electrical treaters 11 and 12 and these signals have been described as being pneumatic or electrical, it will be apparent that other types of signals representative of conditions reflecting operating parameters of the present system can be used.

From the foregoing it will be apparent that there has been provided an electrical treating system well adapted for the preparation from untreated oil of a combustible fuel, which is especially suited for gas turbines. The present system operates in conformity with the best operational advantages of gas turbines, and especially for automated operation with the very minimum of operator attention. It will be understood that certain features and alterations of the present system may be employed without departing from the spirit of this invention. This is contemplated by and is within the scope of the appended claims. Additionally, it is intended that the present description is to be taken as an illustration of the present system.

What is claimed is:

1. An electrical treater system for producing a low sodium ion content combustible fuel comprising:
  a. vessel means having emulsion inlet means, oil phase outlet means and water phase outlet means, and said vessel means containing electrode means energizable from an external power source to create an electrical field for resolving water-in-oil emulsion into a treated oil phase and an effluent water phase;
  b. Supply means for providing streams of untreated oil having a high sodium ion content and a preset amount of fresh water to a mixing means positioned upstream of said vessel means in said emulsion inlet means, said mixing means adjusted for intermixing of the fresh water in a preset finely divided state into the untreated oil to produce the emulsion applied to said emulsion inlet means on said vessel means for introduction of the emulsion into a substantially unseparated state into the electrical field, and the emulsion having the oil as the external phase and dispersed fresh water as the internal phase;
  c. a plurality of monitoring means for generating a plurality of signals indicating respectively, the preset amount of fresh water supplied to said mixing means for intermixing of the fresh water in the preset finely dispersed state into the untreated oil and the water content of the treated oil removed from said oil phase outlet means of said vessel means;
  d. said oil phase outlet means connected to a control valve having a first position to direct the treated oil to a subsequent utilization as a combustible fuel, and said control valve having a second position to divert the treated oil from said subsequent utilization; and
  e. controller means receiving said plurality of signals from said plurality of monitoring means, and said controller means adjusting said control valve from the second position to the first position only when said signals indicate the amount of fresh water intermixed in the finely dispersed state into the untreated oil to produce the emulsion and the water content of the treated oil are within preset operational limits to produce a combustible fuel with reduced sodium ion content.

2. The electrical treater system of claim 1 wherein said control valve in the first position actuates a chemical injecting means whereby a selected chemical is introduced into the treated oil while the treated oil is directed to a subsequent utilization as a combustible fuel.

3. The electrical treater system of claim 1 wherein condition monitoring means generate condition signals indicating predetermined treater parameters including untreated oil flow-rate and temperature, pressure and liquid levels in said vessel means, energization of said electrode means and the interface between oil-water phases in said vessel means, and said condition signals being applied to said controller means whereby a failure of any condition signal to indicate a predetermined treater parameter activates said controller means to adjust said control valve from the first position to the second position.

4. The electrical treater system of claim 3 wherein sequence function means receive said condition signals from said condition monitoring means, and said sequence function means produce a termination of fluid flows in said emulsion inlet means, oil phase outlet means and water phase outlet means, and de-energize said electrode means a preset time interval after said condition signals indicate a failure to maintain any predetermined treater parameter.

5. The electrical treater system of claim 4 wherein said sequence function means receive said condition signal from said condition monitoring means, and said sequence function means are programmed to initiate in a preset chronological order fluid flows in said emulsion inlet means, oil phase outlet means and water phase outlet means, and to energize said electrode means to establish said predetermined treater parameters until receiving condition signals indicating a failure to maintain any predetermined treater parameter.

6. An electrical treater system for producing a low sodium ion content combustible fuel comprising:
  a. vessel means having emulsion inlet means, oil phase outlet means and water phase outlet means, and said vessel means containing electrode means energizable from an external power source to create an electrical field for resolving a water-in-oil emulsion into a treated oil phase and an effluent water phase;

b. supply means for providing streams of untreated oil having a high sodium ion content and fresh water to a mixing means to produce the emulsion applied to said emulsion inlet means on said vessel means, and the emulsion having the oil as the external phase and fresh water as the internal phase;

c. first, second and third monitoring means for generating first, second, and third signals indicating, respectively, the amount of fresh water supplied to said mixing means, the mixing of the fresh water in a finely dispersed state into the untreated oil, and the water content of the treated oil removed from said oil phase outlet means of said vessel means;

d. said oil phase outlet means connected to a control valve having a first position to direct the treated oil to a subsequent utilization as a combustible fuel, and said control valve having a second position to divert the treated oil from said subsequent utilization; and e. controller means receiving said first, second, and third signals from said first, second and third monitoring means, respectively, and said controller means adjusting said control valve from the second position to the first position only when said first, second and third signals indicate the amount of fresh water supplied to said mixing means, the intermixing of the fresh water in the finely dispersed state into the untreated oil to produce the emulsion, and the water content of the treated oil are within preset operational limits to produce a combustible fuel with reduced sodium ion content.

7. The electrical treater system of claim 6 wherein said control valve in the first position actuates a chemical injecting means whereby a selected chemical is introduced into the treated oil while the treated oil is directed to a subsequent utilization as a combustible fuel.

8. The electrical treater system of claim 6 wherein condition monitoring means generate condition signals indicating predetermined treater parameters including untreated oil flow-rate and temperature, pressure and liquid levels in said vessel means, energization of said electrode means and the interface between oil-water phases in said vessel means, and said condition signals being applied to said controller means whereby a failure of any condition signal to indicate a predetermined treater parameter activates said controller means to adjust said control valve from the first position to the second position.

9. The electrical treater system of claim 8 wherein sequence function means receive said condition signals from said condition monitoring means, and said sequence function means produce a termination of fluid flows in said emulsion inlet means, oil phase outlet means and water phase outlet means, and de-energize said electrode means a preset time interval after said condition signals indicate a failure to maintain any predetermined treater parameter.

10. The electrical treater system of claim 9 wherein said sequence function means receive said condition signal from said condition monitoring means, and said sequence function means are programmed to initiate in a preset chronological order fluid flows in said emulsion inlet means, oil phase outlet means and water phase outlet means, and to energize said electrode means to establish said predetermined treater parameters until receiving condition signals indicating a failure to maintain any predetermined treater parameter.

11. An electrical treater system for producing a low sodium ion content combustible fuel comprising:

a. vessel means having emulsion inlet means, oil phase outlet means, and said vessel means containing electrode means energizable from an external power source to create an electrical field for resolving a water-in-oil emulsion into a treated oil phase and a water phase;

b. valve means on said emulsion inlet means, said oil phase outlet means and said water phase outlet means;

c. supply means for providing streams of an untreated oil having a high sodium ion content and fresh water to a mixing means to produce the emulsion supplied to said emulsion inlet means on said vessel means, and the emulsion having the oil as the external phase and fresh water as the internal phase;

d. level control means connected to said valve means on said water outlet means for maintaining each oil-water interface in said vessel means at a preset horizon;

e. indicator means sensing a liquid filled state and the horizon of each oil-water interface in said vessel means;

f. temperature sensing means for monitoring the temperature of the treated oil;

g. flow sensing means associated with said emulsion inlet means to indicate flows of the untreated oil and treated oil streams;

h. pressure sensing means on said vessel means to indicate fluid pressure therein;

i. means for indicating energization of said electrode means;

j. monitoring means for generating first, second, and third signals indicating the certain amount of fresh water supplied to said mixing means, the mixing of the fresh water in a finely dispersed state into the untreated oil, and the water content of the treated oil removed from said oil phase outlet means of said vessel, respectively;

k. said oil phase outlet means connected to a control valve having a first position to direct the treated oil to a subsequent utilization as a combustible fuel, and said control valve having a second position to divert the treated oil from said subsequent utilization;

l. controller means receiving said first, second, and third signals from said monitoring means, and said controller means adjusting said control valve from the second position to the first position only when said first, second, and third signals indicate the certain amount of fresh water supplied to said mixing means, the intermixing of the fresh water in the finely dispersed state into the untreated oil to produce the emulsion, and the water content of the treated oil are within preset operational limits to produce a combustible fuel; and m. condition monitoring means for generating condition signals indicating predetermined treater parameters including untreated oil and treated oil flows and temperature of the untreated oil, pressure and liquid level in said vessel means, energization of said electrode means and each interface between oil-water phases in said vessel means, and said condition signals being applied to said controller means whereby a failure of any condition signal to indicate a predetermined treater parameter will activate said controller means to adjust said control valve from the first position to the second position to divert treated oil from the subsequent utilization as a combustible fuel with a reduced sodium ion content.

12. The electrical treater system of claim 11 wherein sequence function means receive said condition signals from said condition monitoring means, and said sequence function means produce a termination of fluid flows through said valve means in said emulsion inlet means, oil phase outlet means and water phase outlet means, and de-energize said electrode means a preset time interval after said condition signals indicate a failure to maintain any predetermined treater parameter.

13. The electrical treater system of claim 12 wherein said sequence function means receive said condition signals from said condition monitoring means, and said sequence function means are programmed to initiate in a preset chronological order fluid flows in said emulsion inlet means, oil phase outlet means and water phase outlet means, and to energize said electrode means to establish said predetermined treater parameters until receiving condition signals indicating a failure to maintain any predetermined treater parameter.

14. The electrical treater system of claim 12 wherein said control valve in the first position activates a chemical injecting means whereby a selected chemical is introduced into the treated oil while the treated oil is directed to a subsequent utilization as a combustible fuel.

15. An electrical treater system for producing a low sodium ion content combustible fuel comprising:
  a. vessel means having emulsion inlet means, oil phase outlet means and water phase outlet means, and said vessel means containing electrode means energizable from an external power source to create an electrical field for resolving water-in-oil emulsion into a treated oil phase and an effluent water phase;
  b. supply means for providing streams of untreated oil having a high sodium ion content and fresh water to a mixing means to produce the emulsion applied to said emulsion inlet means on said vessel means, and the emulsion having the oil as the external phase and fresh water as the internal phase;
  c. first, second and third monitoring means for generating first, second and third signals indicating, respectively, the amount of fresh water supplied to said mixing means, the mixing of the fresh water in a finely dispersed state into the untreated oil and the water content of the treated oil removed from said oil phase outlet means of said vessel means;
  d. said oil phase outlet means connected to a control valve having a first position to direct the treated oil to a subsequent utilization as a combustible fuel, and said control valve having a second position to divert the treated oil from said subsequent utilization;
  e. controller means receiving said first, second and third signals from said first, second and third monitoring means, and said controller means adjusting said control valve from the second position to the first position only when signals indicate the amount of the fresh water supplied to said mixing means, the intermixing of the fresh water in the finely dispersed state into the untreated oil to produce the emulsion, and the water content of the treated oil are within preset operation limits to produce a combustible fuel with a reduced sodium ion content;
  f. condition monitoring means generating condition signals indicating predetermined treater parameters reside within preset operational limits, and a failure of any condition signal to indicate a predetermined treater parameter activates said controller means to adjust said control valve from the first position to the second position; and
  g. sequence function means interconnected to said controller means and receiving said condition signals from said condition monitoring means, and said condition sequence function means are programmed to (1) initiate in a preset chronological order fluid flows and to energize said electrode means to establish said predetermined treater parameters, (2) maintain the operation of fluid flows in said vessel means and energization of said electrode means for a certain time delay after receiving condition signals indicating a failure to maintain any predetermined treater parameter to permit rectification of the failure in any predetermined treater parameter, and (d) terminate fluid flows in said vessel means and de-energize said electrode means after the certain time delay has lapsed.

* * * * *

UNITED STATES PATENT OFFICE
CERTIFICATE OF CORRECTION

Patent No. 3,855,103                Dated January 14, 1975

Inventor(s)  Theron D. McLaren & Jack T. Sawdy

It is certified that error appears in the above-identified patent and that said Letters Patent are hereby corrected as shown below:

Column 9, line 39, for "single", read ----signal ---;
Column 14, line 2, for "pass stream" read --- pass steam ---;
, line 4, for "stream", read --- steam ---;
, line 6, for "heat", read --- heated ----;and Signed and sealed this 11th day of March 1975.

(SEAL)
Attest:

RUTH C. MASON
Attesting Officer

C. MARSHALL DANN
Commissioner of Patents
and Trademarks